(12) United States Patent
Zahm et al.

(10) Patent No.: US 7,557,748 B1
(45) Date of Patent: Jul. 7, 2009

(54) METHODS AND APPARATUS FOR MEASURING NAVIGATIONAL PARAMETERS OF A LOCOMOTIVE

(75) Inventors: Charles L. Zahm, Indialantic, FL (US); William L. Matheson, Palm Bay, FL (US); Kevin M. Clyne, West Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/585,192

(22) Filed: Jun. 1, 2000

Related U.S. Application Data

(60) Provisional application No. 60/153,304, filed on Sep. 10, 1999.

(51) Int. Cl.
*G01S 5/14* (2006.01)
(52) U.S. Cl. .................... 342/357.08; 701/19; 701/200
(58) Field of Classification Search .................. 701/19, 701/215, 208, 209, 20, 117, 205, 207, 213, 701/214, 224; 342/357.11
See application file for complete search history.

(56) References Cited

U.S. PATENT DOCUMENTS

| | | | | |
|---|---|---|---|---|
| 4,999,782 A | * | 3/1991 | BeVan | 701/120 |
| 5,349,531 A | * | 9/1994 | Sato et al. | 342/357.14 |
| 5,442,363 A | * | 8/1995 | Remondi | 342/357 |
| 5,548,293 A | * | 8/1996 | Cohen | 342/357.11 |
| 5,757,316 A | * | 5/1998 | Buchler | 342/357 |
| 5,828,979 A | | 10/1998 | Polivka et al. | |
| 5,867,122 A | | 2/1999 | Zahm et al. | 342/357 |
| 5,896,947 A | * | 4/1999 | Kumar | 184/3.2 |
| 5,933,110 A | * | 8/1999 | Tang et al. | 342/357.11 |
| 6,005,514 A | * | 12/1999 | Lightsey | 342/365 |
| 6,052,647 A | * | 4/2000 | Parkinson et al. | 342/357.06 |
| 6,161,062 A | * | 12/2000 | Sicre et al. | 340/974 |
| 6,182,793 B1 | * | 2/2001 | Jamison | 184/3.2 |
| 6,184,821 B1 | * | 2/2001 | Hrovat et al. | 342/357.08 |
| 6,199,661 B1 | * | 3/2001 | Kumar | 184/3.2 |
| 6,211,821 B1 | * | 4/2001 | Ford | 342/357.11 |
| 6,218,961 B1 | * | 4/2001 | Gross et al. | 340/903 |
| 6,223,105 B1 | * | 4/2001 | Teague | 701/13 |
| 6,263,266 B1 | * | 7/2001 | Hawthorne | 701/19 |
| 6,266,582 B1 | * | 7/2001 | Bruckner | 342/357.11 |
| 6,313,788 B1 | * | 11/2001 | Wilson | 342/357.11 |
| 6,347,265 B1 | * | 2/2002 | Bidaud | 701/19 |

* cited by examiner

*Primary Examiner*—Khoi Tran
*Assistant Examiner*—Bhavesh V Amin
(74) *Attorney, Agent, or Firm*—Armstrong Teasdale LLP

(57) ABSTRACT

The present invention, in one aspect, is a method for determining motion and/or location parameters of a locomotive. One method embodiment includes steps of phase locking a pair of receivers having antennas at different locations on a locomotive to reference signals received from a set of satellites, determining a set of phase differences between the reference signals received at the antennas, and determining at least one of an accurate heading, heading rate, attitude, and attitude rate of the locomotive using the set of phase differences between the reference signals.

25 Claims, 5 Drawing Sheets

METHODS AND APPARATUS FOR MEASURING NAVIGATIONAL PARAMETERS OF A LOCOMOTIVE

CROSS REFERENCE TO RELATED APPLICATIONS

This application claims the benefit of U.S. Provisional Application No. 60/153,304, filed Sep. 10, 1999, which is hereby incorporated by reference in its entirety.

BACKGROUND OF THE INVENTION

This invention relates generally to methods and apparatus for measuring navigation parameters of a locomotive, and more specifically to methods of determining movement and direction of a track-bound transportation apparatus using GPS satellites.

Modem algorithms for train navigation incorporate very sensitive turn rate gyroscopes (gyros) that permit detection of low speed through high number turnouts such as a #20 equilateral turnout. These gyroscopes are quite expensive, and suffer from coning problems due to superelevation. In addition, measurement drift accumulates over time. This drift must be corrected periodically by reference to data in a track data base. It would therefore be desirable to replace gyroscopes (gyros) in such applications altogether or to provide an alternate system for determining heading accurately for low speed and high speed turnouts. Where trains move over a curving track, the rails wear down due to friction between the wheels of the train and the rails. As used herein, a curve is represented by any change in path direction. Therefore, curving means that a path direction is changing. One solution to this problem is to provide lubricant to the rails or to the wheels when a train is moving. However, this solution is wasteful of lubricant. It would therefore be desirable to provide a method and apparatus to more efficiently reduce rail wear on curving tracks by determining when a train is on a curve and by applying lubricant.

BRIEF SUMMARY OF THE INVENTION

There is therefore provided, in one embodiment, a method for determining motion and/or location parameters of a locomotive. This method embodiment includes steps of phase locking a pair of receivers having antennas at different locations on a locomotive to reference signals received from a set of at least three satellites, determining a set of phase differences between the reference signals received at the antennas, and determining at least one of an accurate heading, and/or heading rate of the locomotive using the set of phase differences between the reference signals.

The above embodiment can be implemented on a train using inexpensive satellite receivers and an inexpensive processor, and can be used in conjunction with a gyroscope having reduced specifications to provide accurate heading information in both low and high speed turnouts. In addition, the heading information provided by this embodiment can advantageously be used to reduce usage of lubricants applied to reduce track wear.

DETAILED DESCRIPTION OF THE INVENTION

Figure 1:
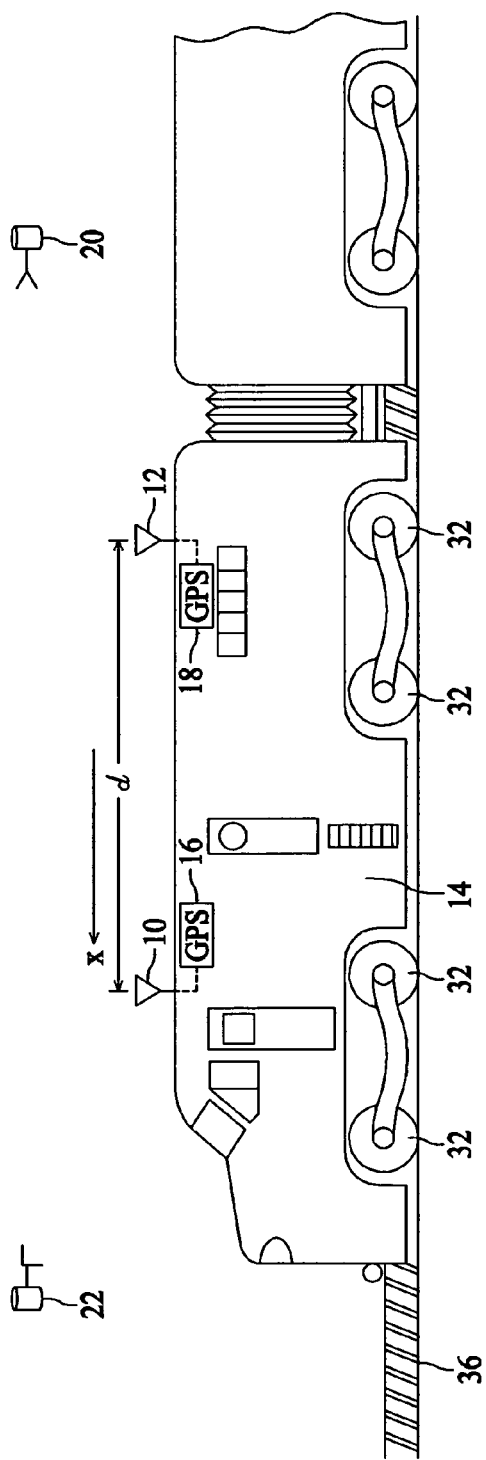
FIG. 1 is a drawing of a locomotive showing a relative location of receiving antennas of one embodiment of the present invention installed thereon.

In one embodiment and referring to FIG. 1, inexpensive carrier phase satellite, for example Global Positioning Satellite (GPS), receivers are used to determine train heading very accurately for low and high speed turnouts, which may be used in locomotive nav-systems.

Two antennas 10, 12 are mounted along a longitudinal or lateral axis x of a locomotive 14 or train car at a known distance d apart. Antenna 10 and antenna 12 feed separate carrier phase GPS receiver 16 and GPS receiver 18, respectively. Receivers 16 and 18 lock on to reference signals from GPS satellites (e.g., 20, 22), and then each receiver 16, 18 performs a carrier phase measurement on a satellite reference signal transmission that it is tracking. This measurement consists of a fractional phase part $\phi$ and an integer count N of phase cycles from an initial epoch $t_0$ to epoch t.

In the following paragraph, a single difference technique is described, although the embodiments described herein can also be applied to a double difference technique. Referring to FIG. 1, antenna 10 of receiver 16 is a distance d away from antenna 12 of receiver 18. Both receivers 16 and 18 receive signals from a satellite, for example 20, at an elevation $\theta$, which is essentially identical for both receivers 16 and 18 because of the distance of satellite 20. However, the distance from each receiver 16 and 18 from satellite 20 is different by a measurable amount. Letting $\phi_1^q$ denote a phase measurement made by receiver 16 and $\phi_2^q$ denote a phase measurement made by receiver 18 for a qth satellite (e.g., q=1 for satellite 20, q=2 for satellite 22), a scaled difference $\Delta\phi_1^q$ is given by:

$$\Delta\phi^q = (\phi_1^q - \phi_2^q) = \lambda(N_1^q - N_2^q) + c)\Delta t_1^q - \Delta t_1^q) + \vec{d}\cdot\vec{h}$$

where $\Delta\phi^q$ is the single difference for the qth satellite;

$\vec{h}$ is a unit vector in the direction of satellite q, $\vec{d}$ is a vector distance between the two antennas 10 and 12, $N_p^q$ is an integer phase count for the pth receiver (e.g., p=1 or 2 for receiver 16 or 18, respectively) and for the qth satellite;

$\Delta t_p^q$ is an error associated with the pth receiver for the qth satellite;

c is the speed of light; and $\lambda$ is a wavelength of the radio signal received from the qth satellite.

To solve for $\vec{d}$, it is assumed that the clock error and the integer ambiguity between both receivers to the satellites are known. The measurements are made to each of n satellites in the GPS system, and integer phase counts and clock errors are known or determined. The following are written, where $LOS_x^q$, $LOS_y^q$, and $LOS_z^q$ are the x, y, and z vector components in the east, north, and up coordinate system of a line of sight to the qth satellite:

$$H = \begin{bmatrix} LOS_x^1 & LOS_y^1 & LOS_z^1 \\ LOS_x^2 & LOS_y^2 & LOS_z^2 \\ \ldots & \ldots & \ldots \\ LOS_x^n & LOS_y^n & LOS_z^n \end{bmatrix}$$

$$\vec{y} = \begin{bmatrix} \Delta\phi^1 - \lambda(N_1^1 - N_2^1) - c(dt_1 - dt_2) \\ \Delta\phi^2 - \lambda(N_1^2 - N_2^2) - c(dt_1 - dt_2) \\ \vdots \\ \Delta\phi^n - \lambda(N_1^n - N_2^n) - c(dt_1 - dt_2) \end{bmatrix}$$

$$\vec{d} = \begin{bmatrix} d_x \\ d_y \\ d_z \end{bmatrix}$$

Vector $\vec{d}$ is a vector representing a baseline in an x, y, and z coordinate system, representing east, north, and up, respectively. Using the above equations, the following is also written:

$$\vec{y} = H\vec{d}$$

A solution to the above equation is written:

$\vec{d} = (H^T H)^{-1} H^T \vec{y}$, subject to the additional condition that:

$\|\vec{d}\|$ = a distance between antennas 10 and 12.

In another aspect of the present invention, double differencing, as known to those skilled in the art, is used to eliminate clock errors of receivers 16 and 18.

Locomotive 14 rides on a track having limited pitch. Maximum pitches range up to about 2 to 3 percent. Therefore, it is much easier to apply the constraint on $\|\vec{d}\|$ and to solve for integer ambiguities of $N_p^q$ than in more general cases. Once $\vec{d}$ is determined, an attitude of locomotive 14 is determined at every epoch. By computing differences in the attitude, the attitude rate is computed. Clock errors and integer ambiguities are readily computed, so that a continuous measurement of heading and heading rate is output from GPS receivers 16 and 18. In particular, heading is given by $$\tan^{-1}\frac{d_x}{d_y},$$

and heading rate is given by $$\frac{\tan^{-1} d_z}{\sqrt{d_x^2 + d_y^2}}.$$

Thus, a continuously updated attitude and attitude rate are available. It is only necessary that receivers 16 and 18 maintain phase lock with received signals from the GPS satellites 20, 22 . . . up to an nth satellite. If phase lock is not maintained cycle slip will occur at which time integer ambiguities will have to be recalculated. Microprocessor 24 coupled to receivers 16 and 18 is used, in one embodiment, to compute at least one of an accurate heading and heading rate. As used herein, microprocessor 24 refers to controllers and processors, including microcontrollers, programmable logic controllers, input/output controllers, reduced instruction set circuits, application specific integrated circuits, logic circuits, and any other circuit, processor or microcomputer capable of processing the embodiments described herein. For example, results are displayed on display 26 or recorded on an internal or external device 28 such as a hard disk or magnetic tape or sent to a navigational computer. In one embodiment, device 28 is a transmitter configured to relay computed location and/or motion information to another location.

A present absolute position of locomotive 14 measured in latitude and longitude is provided by GPS receivers 16 and 18. To resolve an initial integer ambiguity, determine clock offsets, or both, a database 30 is consulted to provide initial heading and grade of a track as a function of the latitude and longitude information. Given LOS values, three unknown parameters $d_x$, $d_y$, and $d_z$ are directly obtained by computation subject to the constraint that a magnitude of d is equal to a distance between antennas 10 and 12.

Figure 2:
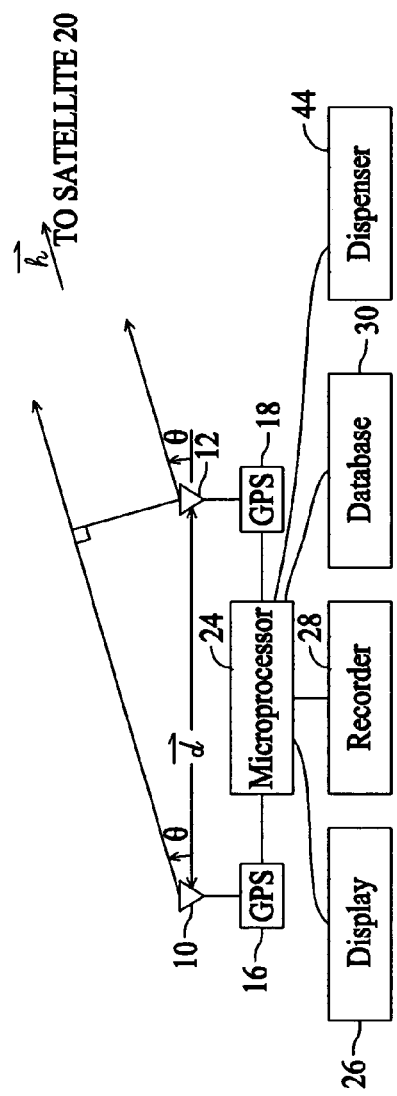
FIG. 2 is a diagram of an embodiment of a heading and attitude system of the present invention.

In yet another embodiment and referring to FIG. 2, track database 30 contains measured or otherwise known track curvatures, indexed by location. A single GPS receiver and antenna, for example GPS receiver 16 and antenna 12, provides a position signal 54 (in addition to any other signals provided for other purposes). Using a location inferred from position signal 54, track database 30 is consulted to determine track curvature C at that location.

Figure 3:
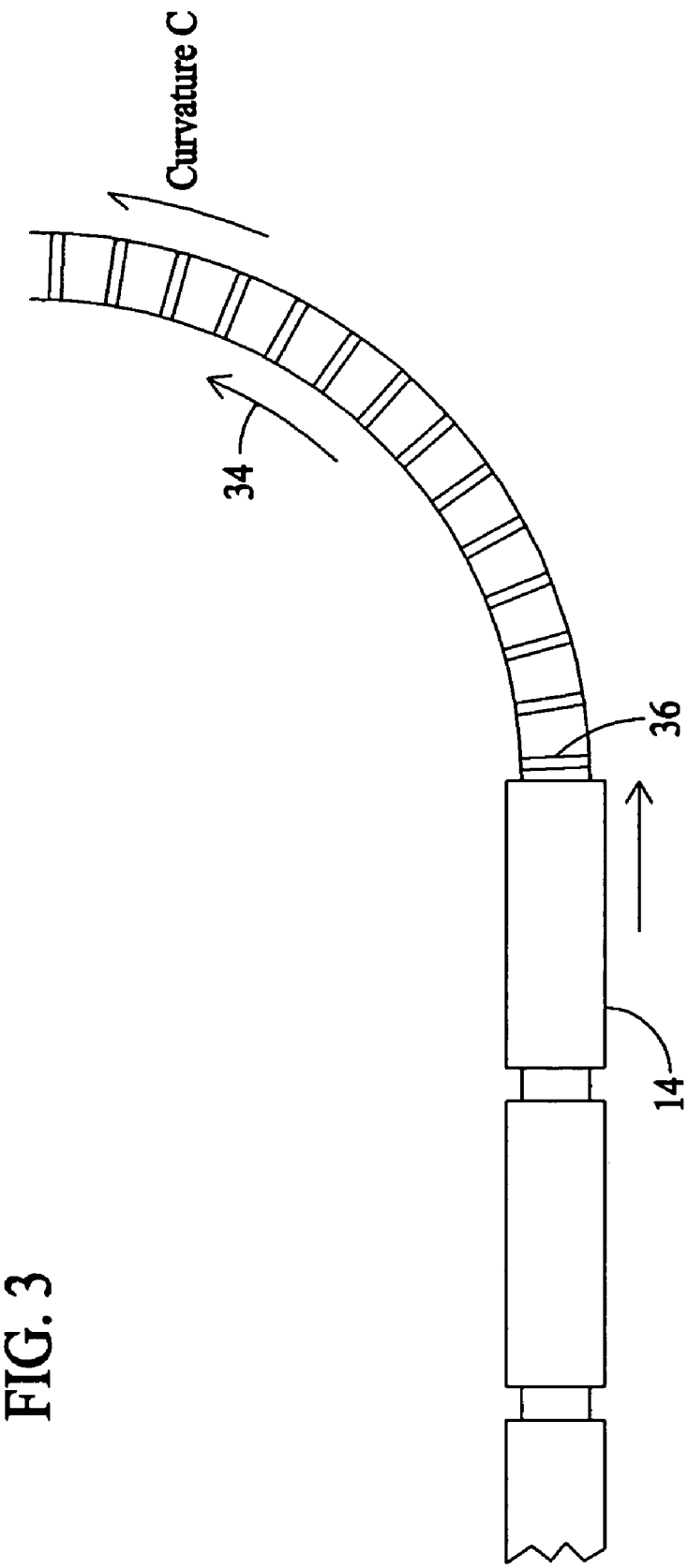
FIG. 3 is a top view of a locomotive on a curving track.
Figure 4:
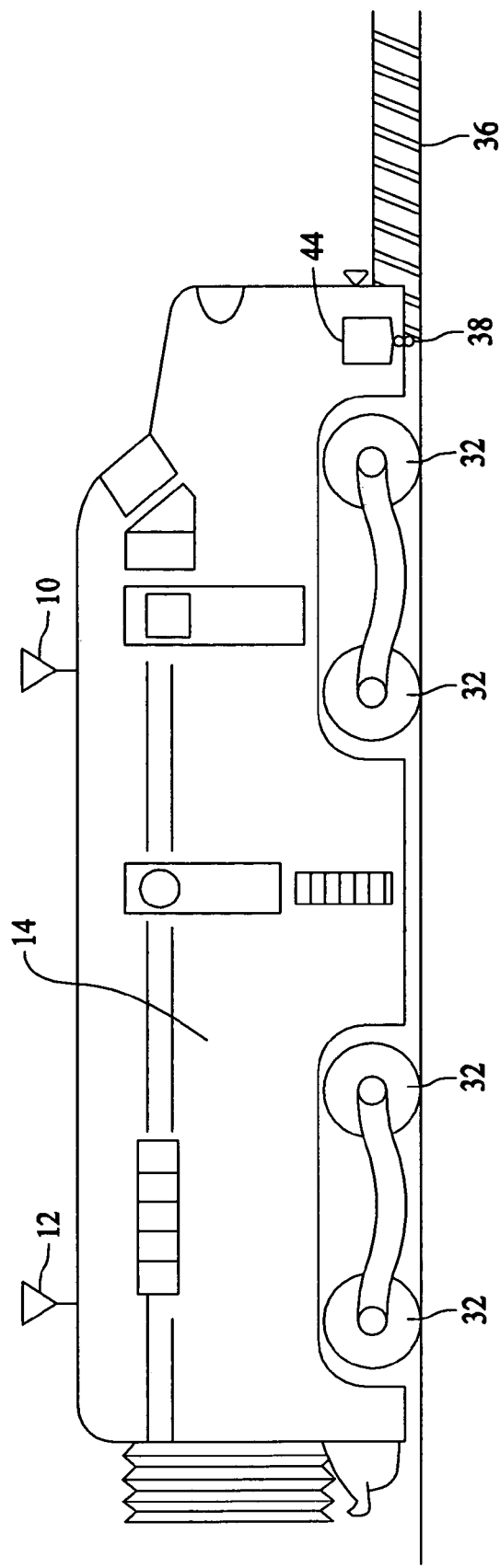
FIG. 4 is a drawing of a locomotive engine showing an embodiment of a lubricant dispenser applying a lubricant to track rails.

Another aspect of the invention is detection of curves and reduction of track wear. Referring to FIGS. 3 and 4, when wheels 32 of locomotive 14 move over curve 34 on a track 36, resulting friction causes track 36 to wear down. A track is worn down, for example, when a crown (not shown) has worn off. By detecting curve 34 and dispensing a lubricant 38 to rails of track 36 while locomotive 14 negotiates curve 34, wear of track 36 rails is reduced. The lubricant 38 may be dispensed from a lubricating system or any system for lubricating the rails of track 36, including lubricant dispenser 44.

Figure 5:
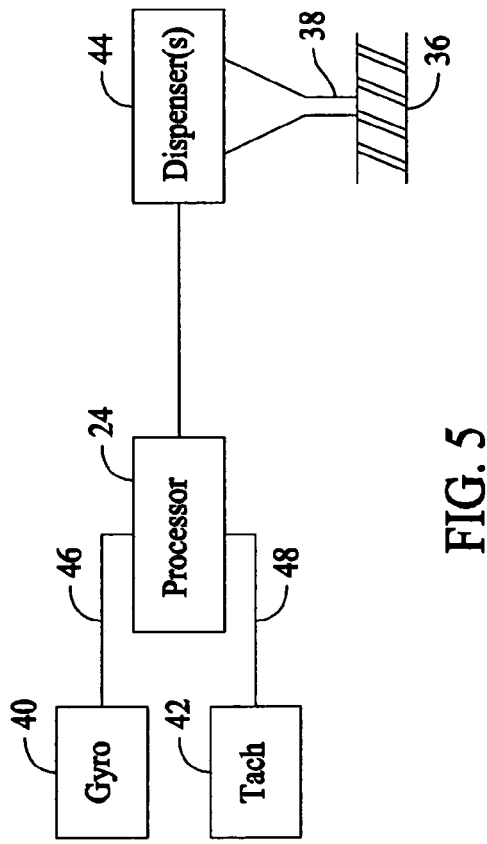
FIG. 5 is a block diagram of an embodiment of a rail lubricant control system of the present invention employing a gyroscope and a tachometer.

Referring to FIG. 5, curves 34 are detected in one embodiment by utilizing a gyroscope 40 to detect an angular rotation rate ω and a tachometer 42 to detect a train velocity v. Curvature C is then written C=ω/v. One or more lubricant dispensers 44 are configured to dispense lubricant 38 to track 36 rails. Specifically, lubricant dispensers 44 are operated by a microprocessor 24, for example, the microprocessor 24 of FIG. 2. Microprocessor 24 is responsive to an angular change signal 46 related to ω and a tachometer signal 48 related to velocity v to operate lubricant dispenser 44 to dispense lubricant 38 to track 36 rails when a predetermined magnitude of curvature C is exceeded.

Figure 6:
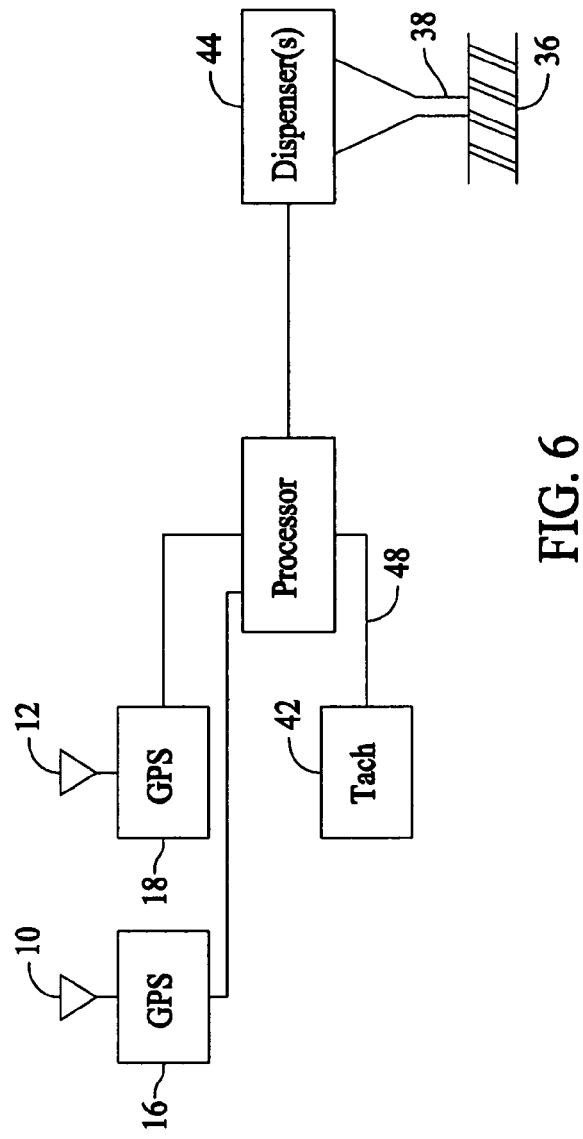
FIG. 6 is a block diagram of an embodiment of a rail lubricant control system of the present invention employing two GPS satellite receivers and a tachometer.

In another embodiment and referring to FIG. 6, an angular change signal (not shown) is determined by microprocessor 24 utilizing signals supplied from a pair of GPS receivers 16 and 18 (such as those also shown in FIG. 2) from signals received at antennas 10 and 12, respectively. This angular change signal is easily obtained because one attribute of attitude is a heading h, and Δh/Δt=ω. Tachometer 42 supplies a tachometer signal 48 in this embodiment, and microprocessor 24 computes C=ω/v.

Figure 7:
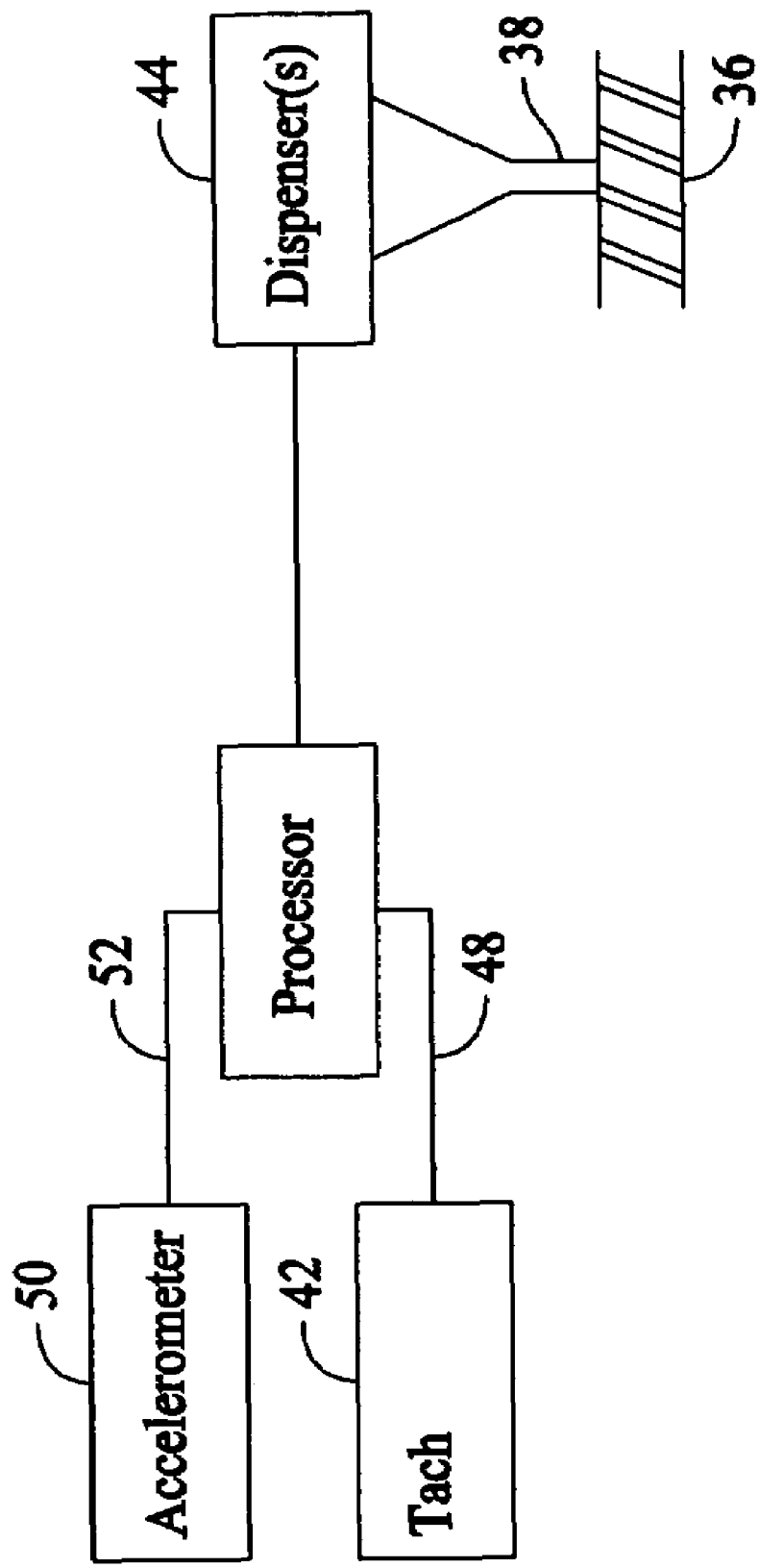
FIG. 7 is a block diagram of an embodiment of a rail lubricant control system of the present invention employing a lateral accelerometer and a tachometer.

In yet another embodiment and referring to FIG. 7, a lateral accelerometer 50 produces or generates a lateral acceleration signal α. Microprocessor 24 is responsive to accelerometer 50, signal 52 and tachometer signal 48 to control lubricant dispensers 44. Lubricant 38 is dispensed when a predetermined magnitude of curvature C, as determined by a ratio $\alpha/v^2$, is exceeded.

Lubricant 38 is applied to reduce friction between wheels 32 and track 36 rails when a magnitude of curvature C is exceeded by an amount to make track wear a concern. Accordingly, in one embodiment, lubricant dispensers 44 are configured to dispense lubricant 38 to wheels 32 rather than directly on track 36 rails.

In embodiments in which measurement accuracy is unacceptably compromised by selective availability (SA), differential GPS (DGPS) is used. (SA results from a time-varying drift that either is, or that can be added deliberately to GPS satellite signals to limit absolute measurement accuracy for commercial and non-military applications.)

Using one of receivers 16 or 18 in conjunction with microprocessor 24, another aspect of the present invention provides accurate measurements of distance traveled by the locomotive 14. However, it will be recognized that this aspect of the invention is also applicable to other land-based vehicles, as well. In one embodiment, a distance traveled is accurately determined even in the presence of SA with or without external DGPS connections. Samples of latitude and longitude from one of the receivers, for example, receiver 16, is sampled frequently enough so that errors in these samples are highly correlated. For example, samples are taken about every second. A distance between the samples is computed as a function of differential latitude and longitude. The difference $\Delta d$ is written as follows:

$$\Delta d = R[\Delta lat^2 + \cos^2(lat)\Delta long^2]^{1/2}$$

where $\Delta lat$ is a difference between latitudes of consecutive measurements;

$\Delta long$ is a difference between longitudes of consecutive measurements; and R is the radius of the earth (about 3,440 nmi).

A total distance traveled is a summation of $\Delta d$ over successive measurements. This distance measurement is accurate even though absolute latitude and longitude measurements are subject to large errors, because these errors are highly correlated between consecutive measurements and cancel out when differences are calculated. Even errors resulting from selective availability are readily cancelled by this method.

From the preceding description of various embodiments of the present invention, it is evident that navigational parameters of a locomotive are efficiently and inexpensively measured utilizing two GPS receivers, and track wear is reduced through efficient use of lubricant.

Even though a GPS satellite system is described, any satellite system or network may be utilized, for example, GPS, DGPS, and Glonass.

Although the invention has been described and illustrated in detail, it is to be clearly understood that the same is intended by way of illustration and example only and is not to be taken by way of limitation. Accordingly the spirit and scope of the invention are to be limited only by the terms of the appended claims and their equivalents.

What is claimed is:

1. A method for determining at least one of motion and location parameters of a railroad locomotive, with the locomotive oriented with either end thereof in the lead in the direction of travel of the locomotive, said method comprising the steps of:

providing at least two satellite signal receivers on the locomotive at spaced locations along the length of the locomotive;

determining a vector distance $\vec{d}$ between the two satellite signal receivers using an integer ambiguity, wherein an initial integer ambiguity is resolved by consulting a database that provides an initial heading and track grade as a function of latitude and longitude;

determining a set of phase differences between satellite reference signals received by satellite receivers; and determining an accurate heading, accurate heading rate, attitude, and attitude rate of the locomotive during normal locomotive transit operation using only the set of phase differences between the satellite reference signals and the vector distance $\vec{d}$ the method further comprising the step of determining $\vec{d}$ as $\vec{d} = (H^T H)^{-1} H^T \vec{y}$, where:

$$H = \begin{bmatrix} LOS_x^1 & LOS_y^1 & LOS_z^1 \\ LOS_x^2 & LOS_y^2 & LOS_z^2 \\ \ldots & \ldots & \ldots \\ LOS_x^n & LOS_y^n & LOS_z^n \end{bmatrix};$$

$$\vec{y} = \begin{bmatrix} \Delta\phi^1 - \lambda(N_1^1 - N_2^1) - c(dt_1 - dt_2) \\ \Delta\phi^2 - \lambda(N_1^2 - N_2^2) - c(dt_1 - dt_2) \\ \vdots \\ \Delta\phi^n - \lambda(N_1^n - N_2^n) - c(dt_1 - dt_2) \end{bmatrix}; \text{ and}$$

$$\vec{d} = \begin{bmatrix} d_x \\ d_y \\ d_z \end{bmatrix},$$

where ø represents a fractional phase part, where
n represents a number of satellites in the GPS system.

2. A method according to claim 1 wherein said step of determining an attitude and an attitude rate of a locomotive using $\vec{d}$ further comprises determining the heading using $$\tan^{-1}\frac{d_x}{d_y}$$

and determining the heading pitch using $$\frac{\tan^{-1} d_z}{\sqrt{d_x^2 + d_y^2}}.$$

3. A method according to claim 1 further comprising the step of determining a track curvature, C.

4. A method according to claim 3 wherein determining a track curvature comprises the step of detecting an angular rotation rate ω and a velocity v of the locomotive, wherein C=ω/v.

5. A method according to claim 4 wherein detecting an angular rotation rate ω and a velocity v of the locomotive comprises the step of detecting an angular rotation rate ω using a gyroscope and a velocity v of the locomotive using a tachometer.

6. A method according to claim 4 wherein detecting an angular rotation rate ω and a velocity v of the locomotive comprises the step of detecting an angular rotation rate $\omega$ using received satellite signals and velocity $v$ of the locomotive using a tachometer.

7. A method according to claim 3 wherein determining a track curvature comprises the step of determining a lateral acceleration $\alpha$ and a velocity $v$ of the locomotive, wherein $C=\alpha/v^2$.

8. A method according to claim 3 further comprising the step of controlling dispensing of a track lubricant in accordance with the determined curvature value C.

9. A method according to claim 8 wherein said step of controlling dispensing of a track lubricant further comprises the step of dispensing the lubricant when C exceeds a predetermined magnitude.

10. A method according to claim 1 further comprising the steps of:
    determining a position of the locomotive; and
    accessing a database of track heading and grade to determine a present track heading and grade at the determined position of the locomotive.

11. A method according to claim 1 further comprising the steps of:
    sampling latitude and longitude from the satellite receivers; and
    determining a distance traveled by the locomotive.

12. A method according to claim 11 wherein said step of sampling latitude and longitude from the satellite receivers further comprises the steps of:
    sampling where the distance between the samples is determined as $\Delta d = R[\Delta lat^2 + \cos^2(lat)\Delta long^2]^{1/2}$ where $\Delta lat$ is a difference between latitudes of consecutive measurements;
    $\Delta long$ is a difference between longitudes of consecutive measurements; and
    R is the radius of the earth (about 3,440 nmi); and
    said step of determining a distance traveled by the locomotive further comprises the step of summing $\Delta d$ over successive measurements.

13. An apparatus for determining at least one of motion and location parameters of a railroad locomotive to detect curves and reduce track wear, with the locomotive oriented with either end of the locomotive in the lead in the direction of travel of the locomotive, said apparatus comprising:
    at least two phase-locking satellite receivers configured to reference signals received from a set of satellites; and
    a processor configured to:
    determine a set of phase differences between the reference signals received by said satellite receivers;
    determine a vector distance $\vec{d}$ between the two satellite receivers using an integer ambiguity, wherein an initial integer ambiguity is resolved by consulting a database that provides an initial heading and track grade as a function of latitude and longitude; and
    determine an accurate heading, accurate heading rate, attitude, and attitude rate of the locomotive during normal locomotive transit operation using only the set of phase differences between the reference signals and the vector distance $\vec{d}$ wherein said processor is further configured to determine $\vec{d}$ as $\vec{d} = (H^T H)^{-1} H^T \vec{y}$, where:

$$H = \begin{bmatrix} LOS_x^1 & LOS_y^1 & LOS_z^1 \\ LOS_x^2 & LOS_y^2 & LOS_z^2 \\ \ldots & \ldots & \ldots \\ LOS_x^n & LOS_y^n & LOS_z^n \end{bmatrix};$$

$$\vec{y} = \begin{bmatrix} \Delta\phi^1 - \lambda(N_1^1 - N_2^1) - c(dt_1 - dt_2) \\ \Delta\phi^2 - \lambda(N_1^2 - N_2^2) - c(dt_1 - dt_2) \\ \vdots \\ \Delta\phi^n - \lambda(N_1^n - N_2^n) - c(dt_1 - dt_2) \end{bmatrix}; \text{ and}$$

$$\vec{d} = \begin{bmatrix} d_x \\ d_y \\ d_z \end{bmatrix},$$

where
    $\phi$ represents a fractional phase part, and
    n represents a number of satellites in the GPS system.

14. An apparatus according to claim 13 wherein said processor configured to determine the heading using $$\tan^{-1}\frac{d_x}{d_y}$$

and the heading rate using $$\frac{\tan^{-1} d_z}{\sqrt{d_x^2 + d_y^2}}.$$

15. An apparatus according to claim 13 wherein said processor further configured to determine a track curvature, C.

16. An apparatus according to claim 15 wherein to determine a track curvature, said processor configured to detect an angular rotation rate $\omega$ and velocity $v$ of the locomotive.

17. An apparatus according to claim 16 wherein to detect an angular rotation rate $\omega$ and velocity $v$ of the locomotive, said processor configured to detect an angular rotation rate $\omega$ using received satellite signals and velocity $v$ of the locomotive using a tachometer.

18. An apparatus according to claim 16 wherein to detect an angular rotation rate $\omega$ and velocity $v$ of the locomotive, said processor configured to detect an angular rotation rate $\omega$ using a gyroscope and velocity $v$ of the locomotive using a tachometer.

19. An apparatus according to claim 15 wherein to determine a track curvature, said processor further configured to:
    determine a lateral acceleration $\alpha$ and a velocity $v$ of the locomotive; and
    determine track curvature C as: $C=\alpha/v^2$.

20. An apparatus according to claim 15 further comprising a device for dispensing a lubricant to a track.

21. An apparatus according to claim 20 wherein said processor further configured to control said device dispensing the lubricant in accordance with the determined curvature value C.

22. An apparatus according to claim 21 wherein said processor further configured to dispense the lubricant when C exceeds a predetermine magnitude.

23. An apparatus according to claim 20 wherein said processor further configured to:
- determine a position of the locomotive;
- access a database of track heading and grade to determine a present track heading and grade at the determined position of the locomotive; and
- control said device dispensing lubricant in accordance with a curvature value C contained within the track database.

24. An apparatus according to claim 13 wherein said processor further configured to:
- sample latitude and longitude from the GPS receivers; and
- determine a distance traveled by the locomotive.

25. An apparatus according to claim 24 wherein said processor configured to determine a distance between samples as:

$$\Delta d = R[\Delta \text{lat}^2 = \cos^2(\text{lat}) \Delta \text{long}^2]^{1/2}.$$

* * * * *